(12) United States Patent
Miyashita et al.

(10) Patent No.: US 7,583,316 B2
(45) Date of Patent: Sep. 1, 2009

(54) DIGITAL CAMERA AND MOBILE TELEPHONE HAVING DIGITAL CAMERA

(75) Inventors: Akihiro Miyashita, Kawasaki (JP); Kiyoshi Nakanishi, Kawasaki (JP); Toshiyuki Tsumura, Yokohama (JP); Fumihiro Muramatsu, Hamamatsu (JP); Michitaka Suzuki, Hamamatsu (JP)

(73) Assignee: Panasonic Corporation, Osaka (JP)

( * ) Notice: Subject to any disclaimer, the term of this patent is extended or adjusted under 35 U.S.C. 154(b) by 517 days.

(21) Appl. No.: 10/532,399

(22) PCT Filed: Oct. 20, 2003

(86) PCT No.: PCT/JP03/13384

§ 371 (c)(1),
(2), (4) Date: Apr. 22, 2005

(87) PCT Pub. No.: WO2004/039065

PCT Pub. Date: May 6, 2004

(65) Prior Publication Data

US 2006/0044396 A1    Mar. 2, 2006

(30) Foreign Application Priority Data

Oct. 24, 2002  (JP)  ............... 2002-309348

(51) Int. Cl.
*H04N 5/225*  (2006.01)
*H04N 5/222*  (2006.01)

(52) U.S. Cl. .............. 348/376; 348/333.05; 348/333.06

(58) Field of Classification Search ............ 348/207.99, 348/148; 455/90, 66; 345/629, 418, 474
See application file for complete search history.

(56) References Cited

U.S. PATENT DOCUMENTS 6,141,036 A * 10/2000 Katayama et al. ............. 348/47

(Continued)

FOREIGN PATENT DOCUMENTS

CN    02130344.4    8/2002

(Continued)

*Primary Examiner*—Nhan T Tran
*Assistant Examiner*—Amy Hsu
(74) *Attorney, Agent, or Firm*—Pearne & Gordon LLP

(57) ABSTRACT

It is an object of the present invention to provide a digital camera and a portable telephone equipped with a digital camera in which while a user views one monitor screen, the user can selectively photograph an image located in the side of the face of the user and an image located in an opposite side to the face of the user without turning out the digital camera or the portable telephone having the digital camera under a state that the user holds the digital camera or the portable telephone having the digital camera. The digital camera and the portable telephone having the digital camera of the present invention include a first camera mounted on a first surface of a casing member, a second camera mounted on a second surface in the back side of the first surface of the casing member and a camera selecting unit for selecting a photographing camera. Thus, while the user holds the portable telephone having the camera, the user can photograph the face of the user himself or herself by the first camera, can photograph a scene viewed by the user himself or herself by the second camera or can photograph both the face and the scene at the same time. Further, a synthesizing unit is provided for synthesizing the images respectively photographed by the first camera and the second camera. Accordingly, a synthesized photograph obtained by synthesizing both the images can be taken or after the images are photographed, the images can be synthesized.

7 Claims, 17 Drawing Sheets

U.S. PATENT DOCUMENTS

| | | | |
|---|---|---|---|
| 6,639,626 B1* | 10/2003 | Kubo et al. | 348/218.1 |
| 6,697,083 B1* | 2/2004 | Yoon | 345/658 |
| 6,750,914 B2* | 6/2004 | Sannoh et al. | 348/346 |
| 7,003,318 B2* | 2/2006 | Kota et al. | 455/556.1 |
| 2001/0003707 A1* | 6/2001 | Moriya | 455/566 |
| 2001/0004269 A1* | 6/2001 | Shibata et al. | 348/333.06 |
| 2003/0081137 A1* | 5/2003 | Yamazaki | 348/354 |
| 2004/0021792 A1* | 2/2004 | Yasui | 348/373 |
| 2004/0048633 A1* | 3/2004 | Sato et al. | 455/556.1 |
| 2005/0237424 A1* | 10/2005 | Weekamp et al. | 348/373 |
| 2006/0181607 A1* | 8/2006 | McNelley et al. | 348/14.08 |
| 2008/0218609 A1* | 9/2008 | Blanquart et al. | 348/243 |

FOREIGN PATENT DOCUMENTS

| | | |
|---|---|---|
| GB | 2 379 828 A | 3/2003 |
| JP | 2001-245034 | 9/2001 |
| JP | 2002-176478 | 6/2002 |
| JP | 2002-209133 | 7/2002 |
| JP | 2003-060765 | 2/2003 |
| JP | 2003-115911 | 4/2003 |
| JP | 2003-274376 | 9/2003 |
| JP | 2003-283618 | 10/2003 |
| JP | 2003-298884 | 10/2003 |
| JP | 2003-319043 | 11/2003 |

* cited by examiner

DIGITAL CAMERA AND MOBILE TELEPHONE HAVING DIGITAL CAMERA

TECHNICAL FIELD

The present invention relates to a digital camera and a portable telephone equipped with a digital camera on which a digital camera is mounted.

BACKGROUND ART

A recent digital camera has been progressively miniaturized and a portable telephone on which the digital camera is mounted to photograph the face of a user or the landscape in a neighborhood has been put to practical use. Further, to photograph both a front side and an opposite side, a method that one digital camera mounted on the portable telephone is rotated or detachably attached to the portable telephone to change its direction has been known (for instance, see Patent Document 1). However, most of the portable telephones that have been used have the cameras fixed on either the front sides or the opposite sides.

FIG. 16 shows a schematic sectional view of a usual portable telephone 200 with a digital camera. The portable telephone 200 with the digital camera supports a second casing member 214 at the hinge 213 of an end of an arm extending from a first casing member 212 so as to freely open and close. To the second casing member 214, a magnet 222 for detecting opening and closing operations, a receiver 224, a liquid crystal display device 201 viewed by an operator when the second casing member 214 is opened, a back light 209 for the liquid crystal display device 201 and a camera 230 are attached. The camera 230 is arranged so that while the user (not shown in the drawing) of the portable telephone 200 holds the portable telephone, the user can photograph the face or the user can recognize a monitor image on the liquid crystal display device 201. The liquid crystal display device 201 is driven by a driver circuit 241. The liquid crystal display device 201, the back light 209, the receiver 224 and the camera 230 are respectively connected to a flexible controlling board 216 having a branching end. The other end of the flexible controlling board 216 is connected to a main body board 215 in the first casing member 212.

The main body board 215 of the portable telephone is provided in the first casing member 212. To the main body board 215, the respective circuits of a control part 218, a memory 219 and a radio part 220, a key operating part 217, a microphone 223 and an opening and closing detecting unit 221 are attached to realize a radio communication function as the portable telephone.

In FIG. 17, the schematic block diagram of the usual portable telephone 200 having the digital camera is shown. In FIG. 17, to the control part 218, the driver circuit 241 is connected and the liquid crystal display device 201 is connected to the driver circuit 241. In the driver circuit 241, a memory part 251 for temporarily storing image information to be displayed is provided. Further, to the control part 218, the memory 219 in which the image information is stored, the back light 209 for the liquid crystal display device 201 as a completely transmitting type liquid crystal display device, the radio part 220 for performing a radio communication, the microphone 223 for transmitting voice, the receiver 224 for receiving voice, the key operating part 217, the opening and closing detecting unit 221 and the camera 230 are connected.

A photographing operation carried out by the camera 230 of the usual portable telephone 200 equipped with the digital camera will be described below. The user of the portable telephone 200 holds the first casing member 212 and opens the second casing member 214 to input a camera mode selecting signal by using the key operating unit 217 and operate a camera mode by the control part 218. When the camera mode is obtained, the user picks up an image by an image pick-up unit of the camera 230 that is not in the drawing to display a monitor image on the liquid crystal display device 201. When the user presses a shutter button serving as a camera shutter that is allocated to the ten key of the key operating unit 217, the image photographed by the camera 230 is stored in the memory 219 and the stored image is displayed on the liquid crystal display device 201. Then, when a camera mode completion signal is inputted from the key operating part 217 or the opening and closing detecting unit 221 detects that the second casing member 214 is closed, the control part 218 turns off the power of the camera 230 to complete the camera mode.

Then, the image stored in the memory 219 can be read and displayed on the liquid crystal display device 201 by operating the key operating unit 217 or transmitted to other portable telephone by using the radio part 220 or the photographed image can be printed by connecting the portable telephone 200 to a printer that is not shown in the drawing by a cable.

(Patent Document 1) JP-A-2001-245034 (Pages 3 to 4, FIG. 1)

An existing ordinary digital camera has a camera on one surface of a casing member and a monitor screen on a surface opposite to the camera. The camera has a structure in which when the user photographs an object, the user (photographer) directs the camera to the object to be photographed and views the monitor screen in the opposite side to the camera and presses a shutter button. Accordingly, when the user holds the digital camera to photograph the face of the user himself or herself, the user turns the inside of the digital camera out. In this case, since the user himself or herself is the object to be photographed, the user cannot inconveniently view the monitor screen located in the opposite side of the camera.

Especially, in the portable telephone having the digital camera on which the digital camera is mounted, even when the camera 230 and the liquid crystal display device 201 are provided on the same plane as shown in FIG. 16, operations for turning out the portable telephone having the digital came are necessary when the face of the user is photographed and when an image located in the opposite side to the face of the user is photographed. However, it is more difficult to hold the portable telephone having the digital camera under a state that the portable telephone is turned out than to hold a digital camera under the same state. Further, the shutter button is undesirably hardly pressed down.

Further, a shutter chance is taken aim at once under a camera mode, however, the chance does not come so that a next shutter chance is taken aim at. At this time, when the second casing member 214 is closed, the opening and closing detecting unit 221 detects that the second casing member 214 is closed and the control part 218 turns off the power of the camera 230 to complete the camera mode. Therefore, when the second casing member 214 is subsequently opened, the camera mode needs to be started from its setting operation so that the shutter chance is undesirably missed.

It is a first object of the present invention to provide a digital camera and a portable telephone equipped with a digital camera in which while a user views one monitor screen, the user can selectively photograph an image located in the side of the face of the user and an image located in an opposite side to the face of the user without turning out the digital camera or the portable telephone having the digital camera under a state that the user holds the digital camera or the portable telephone having the digital camera.

It is a second object of the present invention to provide a digital camera and a portable telephone equipped with a digital camera in which an image located in the side of the face of a user and an image located in an opposite side to the face of the user can be photographed at the same time under a state that the digital camera or the portable telephone having the digital camera is held by a hand.

Further, it is a third object of the present invention to provide a digital camera and a portable telephone equipped with a digital camera in which while the digital camera or the portable telephone having the digital camera is held by a hand, an image located in the side of the face of a user holding the portable telephone and an image located in an opposite side of the face of the user can be photographed as a synthesized image.

Further, it is a fourth object of the present invention to realize a function for completing a camera mode only by closing a casing member of a foldable portable telephone under a state that the camera mode is operated and operating again the camera mode only by directly opening the casing member so that a shutter chance is not missed.

DISCLOSURE OF THE INVENTION

In order to solve the above-described first problem, a digital camera according to the present invention comprises: a first camera provided on a first surface of a casing member; a second camera provided on a second surface in the back side of the first surface of the casing member; and a camera selecting unit for selecting a photographing camera to photograph an image by selecting the photographing camera.

With the above-described structure employed, while a user holds a digital camera or a portable telephone equipped with a digital camera by a hand, the user can selectively photograph an image located in the side of the face of the user and an image located in an opposite side to the face of the user without turning out the digital camera or the portable telephone having the digital camera.

Further, in order to solve the above-described second problem, both the first camera and the second camera are selected by the camera selecting unit to photograph images by both the first camera and the second camera at the same time.

Thus, under the state that the digital camera or the portable camera having the digital camera is held by a hand, the image located in the side of the face of the user and the image located in the opposite side to the face of the user can be photographed at the same time.

In order to solve the above-described third problem, an image synthesizing unit is further provided for synthesizing the images photographed by the first camera and the second camera to photograph the synthesized image obtained by synthesizing the images photographed by the first camera and the second camera.

Thus, a synthesized photograph can be obtained in which the image located in the side of the face of the user is synthesized with the image located in the opposite side to the face of the user as one image.

Further, for solving the above-described fourth problem, in a foldable portable telephone equipped with a digital camera on which a digital camera is mounted according to the present invention, under a state that a camera mode is operated by a camera mode setting unit, when an opening and closing detecting unit detects that a casing member of the foldable portable telephone is closed, a camera mode completing unit completes the camera mode. However, when the opening and closing detecting unit detects that the casing member of the foldable portable telephone is opened without an input of other signal, the camera mode is operated again by the camera mode setting unit.

Thus, while the camera mode is operated, only when the casing member of the foldable portable telephone is closed, the camera mode is completed. Further, only when the casing member is directly opened, the camera mode is operated again to prevent a shutter chance from being missed.

Figure 1:
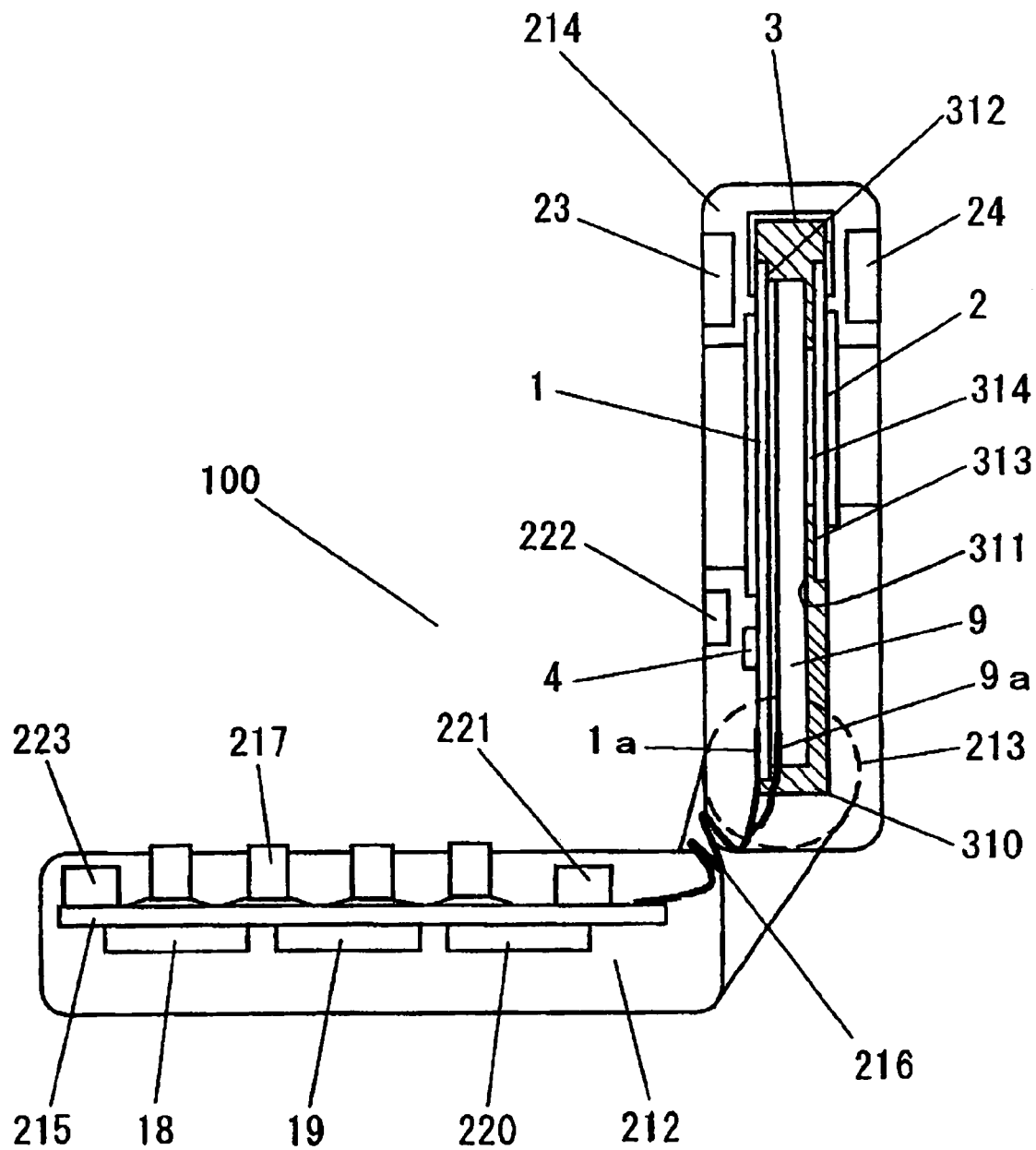
FIG. 1 is a schematic sectional view of a portable telephone equipped with a digital camera according to a first embodiment of the present invention.

In the drawings, reference numeral 1 designates a first liquid crystal display part. 2 designates a second liquid crystal display part. 3 designates a connecting flexible board. 4 designates a driver circuit. 9 designates a back light. 18 designates a control part. 19 designates a memory. 23 designates a first camera. 24 designates a second camera. 41 designates a memory part. 42 designates a display switching part. 212 designates a first casing member. 213 designates a hinge. 214 designates a second casing member. 215 designates a main body board. 217 designates a key operating part. 219 designates a memory. 220 designates a radio part. 221 designates an opening and closing detecting unit. 223 designates a microphone. 224 designates a receiver. 310 designates a holder.

BEST MODE FOR CARRYING OUT THE INVENTION

A digital camera according to the present invention includes: a first camera provided on a first surface of a casing member; a second camera provided on a second surface in the back side of the first surface of the casing member; a control unit for controlling the photographing operations of the first camera and the second camera; a camera selecting unit for selecting a photographing camera; a camera shutter unit; a monitor unit; and an image storing unit. Thus, the photographing camera is selected by the camera selecting unit to photograph an image.

According to this structure, under a state that the digital camera is held by a hand, an image located in the side of the face of a user and an image located in an opposite side to the face of the user can be selectively photographed without turning out the digital camera.

Further, in the digital camera according to the present invention, both the first camera and the second camera are selected by the camera selecting unit to photograph images by both the first camera and the second camera at the same time.

According to this structure, under a state that the digital camera is held by a hand, an image located in the side of the face of a user and an image located in an opposite side to the face of the user can be photographed at the same time.

Further, in the digital camera according to the preset invention, an image synthesizing unit is further provided for synthesizing the images photographed by the first camera and the second camera in addition to the above-described structure to photograph the synthesized image obtained by synthesizing the images photographed by the first camera and the second camera.

According to this structure, a synthesized photograph can be obtained in which the image located in the side of the face of the user is synthesized with the image located in the opposite side to the face of the user as one image.

Further, in the digital camera according to the present invention, one screen of the monitor unit is divided into a first display area and a second display area to display all part or a part of the image photographed by the first camera in the first display area and display all part or a part of the image photographed by the second camera in the second display area. The images photographed by the first camera and the second camera that are displayed on the monitor unit are photographed as the synthesized image.

According to this structure, all part or a part of the image photographed by the first camera can be displayed in the first display area and all part or a part of the image photographed by the second camera can be displayed in the second display area.

Further, in the digital camera according to the present invention, the monitor unit is formed with a first liquid crystal display part and a second liquid crystal display part. The first liquid crystal display part is provided in the surface side of the casing member in which the first camera is provided. The second liquid crystal display part is provided in the surface side of the casing member in which the second camera is provided. The image photographed by the first camera or the second camera is displayed on the first liquid crystal display part or the second liquid crystal display part of the monitor unit.

According to this structure, the image photographed by the first camera or the second camera can be viewed on the first liquid crystal display part or the second liquid crystal display part of the monitor unit.

Further, in the digital camera according to the present invention, a moving image is photographed by the first camera or the second camera to store the moving image in the image storing unit.

According to this structure, under a state that the digital camera is held by a hand, a moving image located in the side of the face of the user and a moving image located in the opposite side to the face of the user can be photographed without turning out the digital camera.

Further, a portable telephone with a digital camera according to the present invention has a structure as the portable telephone equipped with a digital camera on which any of the above-described digital cameras is mounted. According to this structure, under a state that the portable telephone having the digital camera is held by a hand, an image located in the side of the face of the user and an image located in the opposite side to the face of the user can be photographed without turning out the portable telephone having the digital camera.

Further, a foldable portable telephone equipped with a digital camera on which a digital camera is mounted according to the present invention comprises: a camera mode setting unit; a camera mode completing unit; and an opening and closing detecting unit. Under a state that a camera mode is operated by the camera mode setting unit, when the opening and closing detecting unit detects that a casing member of the foldable portable telephone is closed, the camera mode completing unit completes the camera mode. However, when the opening and closing detecting unit detects that the casing member of the foldable portable telephone is opened without an input of other signal, the camera mode is operated again by the camera mode setting unit.

Thus, while the camera mode is operated, only when the casing member of the foldable portable telephone is closed, the camera mode is completed. Further, only when the casing member is directly opened, the camera mode is operated again to prevent a shutter chance from being missed.

Now, embodiments of the present invention will be described by referring to the drawings.

FIRST EMBODIMENT

Figure 16:
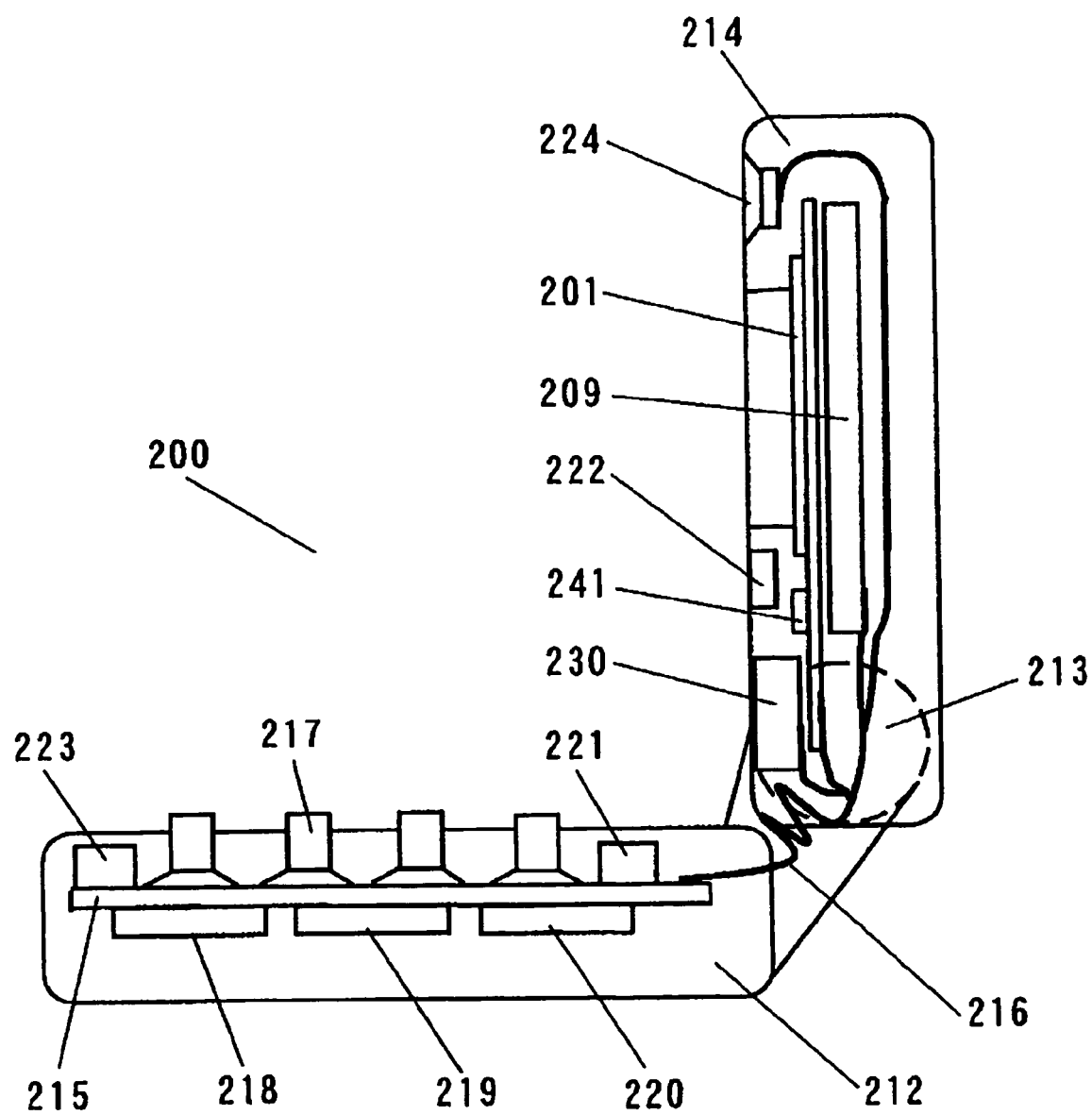
FIG. 16 is a schematic sectional view of a usual portable telephone equipped with a digital camera.
Figure 17:
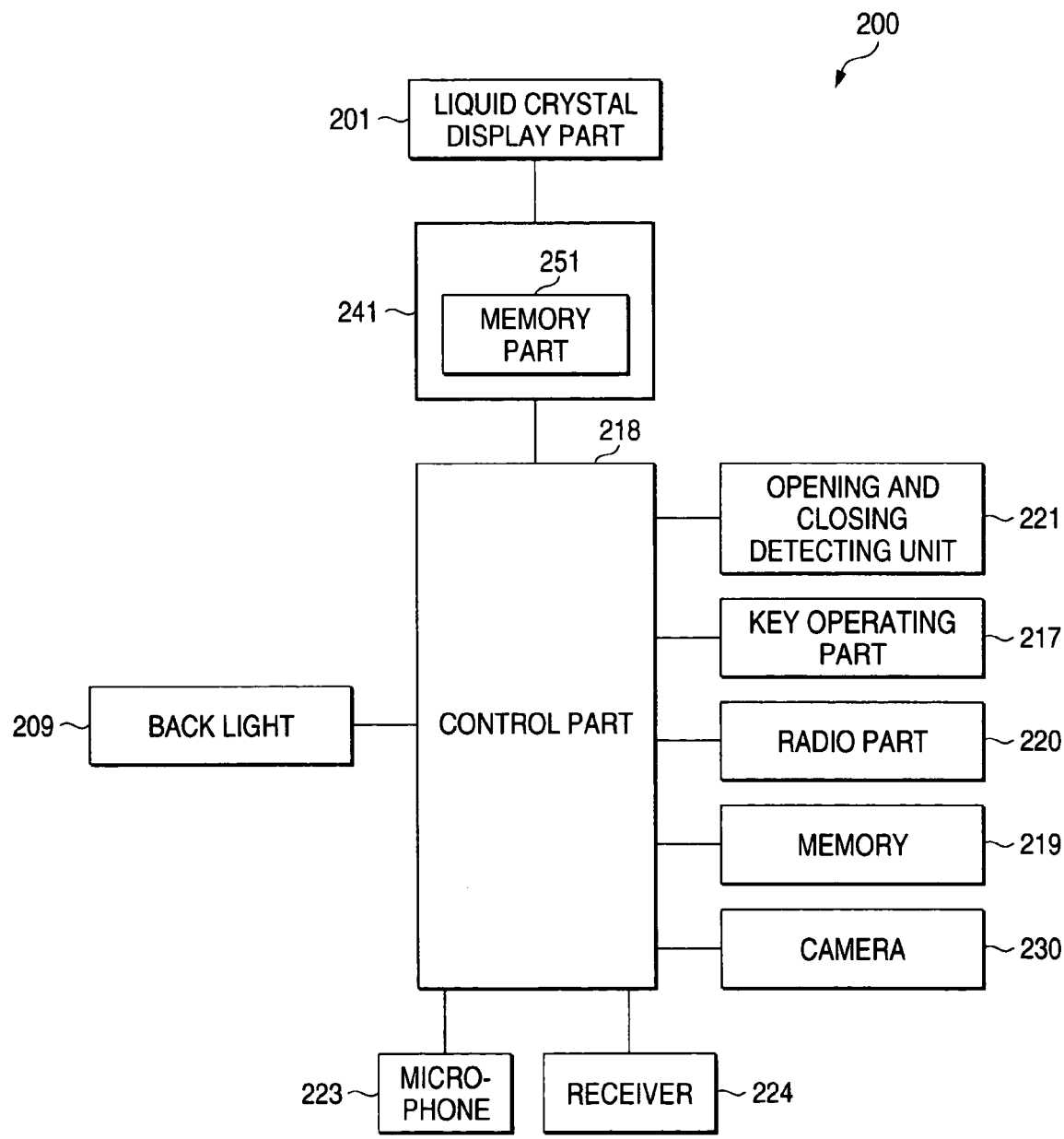
FIG. 17 is a schematic block diagram of the usual portable telephone having the digital camera.

FIG. 1 sows a schematic sectional view of a portable telephone equipped with a digital camera according to a first embodiment of the present invention. The structure of the portable telephone 100 equipped with the digital camera of the present invention shown in FIG. 1 is greatly different from the structure of the existing example from the viewpoint that two cameras and two liquid crystal display parts are provided in a second casing member 214. However, many parts of the portable telephone 100 having the digital camera are the same as those of the usual example explained by referring to FIG. 16 as well as the basic structures of the first casing member 212 and the second casing member 214. Thus, the same parts are designated by the same reference numerals and an explanation thereof is omitted.

In FIG. 1, a back light 9 is fitted to a first recessed part 311 of a holder 310 to which a plurality of liquid crystal display parts are attached. A first liquid crystal display part 1 is fitted to a second recessed part 312 of the holder 310 in the upper part of the back light 9. In the first liquid crystal display part 1, a driver circuit 4 is provided. A connecting flexible board 3 is connected to one end of the first liquid crystal display part 1 and a second liquid crystal display part 2 is connected to the end of the connecting flexible board 3. The second liquid crystal display device 2 is added to the first liquid crystal display part 1 through the connecting flexible board 3. Both the liquid crystal display parts are driven by the driver circuit 4. The connecting flexible board 3 is bent in a U shape from the first liquid crystal display part of the holder 310 to the second liquid crystal display part to fit the second liquid crystal display part 2 connected to the end of the connecting flexible board 3 to a third recessed part 313 of the holder 310. In the holder 310, a hole part 314 corresponding to the size of the second liquid crystal display part 2 is opened to allow the light of the back light 9 to pass to the second liquid crystal display part 2. Then, an end part 1a of the first liquid crystal display part 1 and an end part 9a of the back light 9 are respectively connected to a controlling flexible board 216 whose end branches. The controlling flexible board 216 is connected to a main body board 215 of a first casing member 212. As described above, in the portable telephone 100 having the digital camera of the present invention, a liquid crystal display device in the second casing member 214 has a structure that the back light 9, the first liquid crystal display part 1 and the second liquid crystal display part 2 integrally formed with the first liquid crystal display part 1 by the connecting flexible board 3 are respectively fitted to the first recessed part 311, the second recessed part 312 and the third recessed part 313 of the holder 310 to assemble one liquid crystal display unit.

Particularly, in the second casing member 214, a first camera 23 and a second camera 24 are respectively provided in the first liquid crystal display part side and the second liquid crystal display part side. The first camera 23 and the second camera 24 are respectively connected to the controlling flexible board 216 whose end branches, which is not shown in the drawing.

Figure 2:
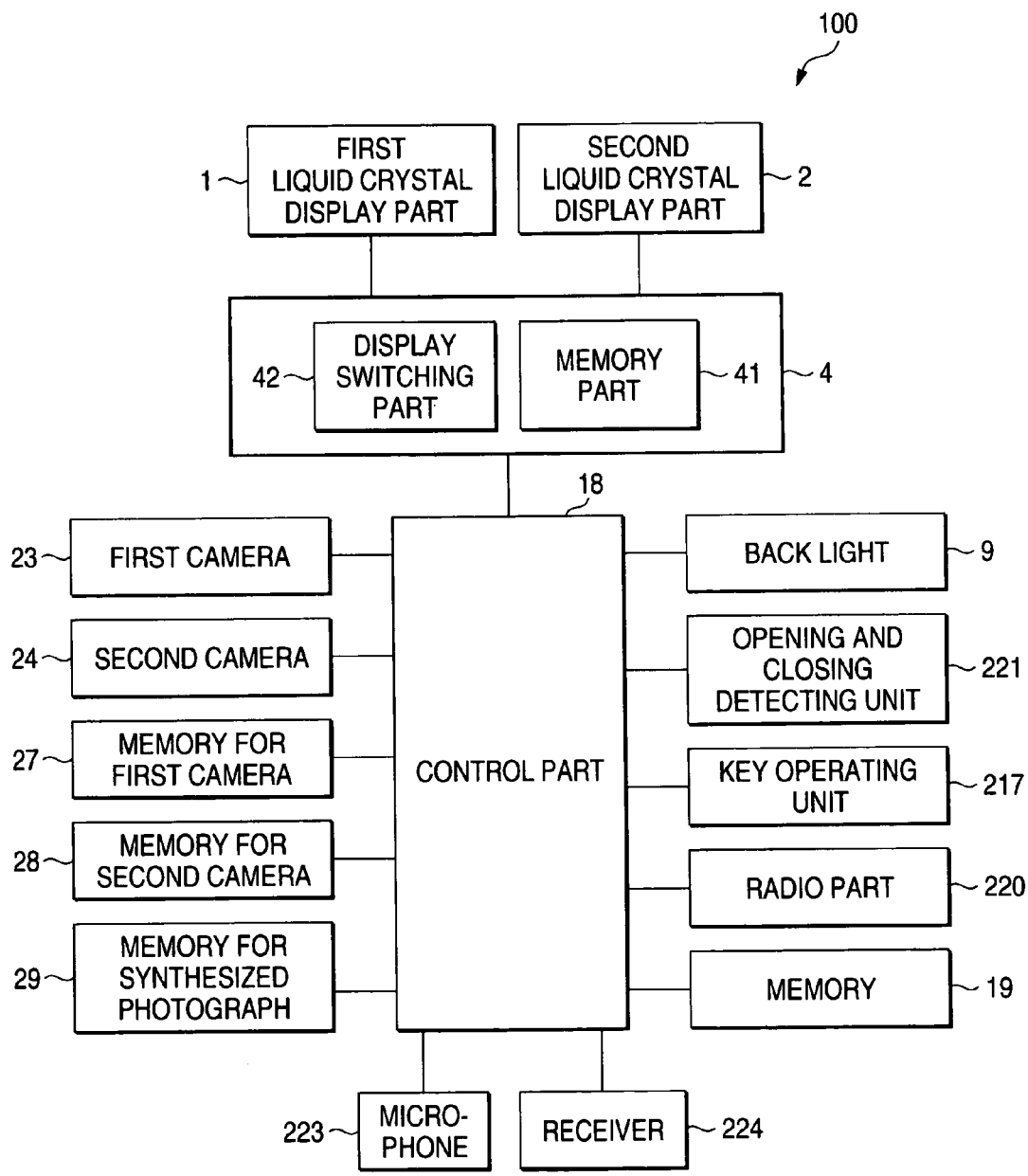
FIG. 2 is a schematic block diagram of the portable telephone having the digital camera according to the first embodiment of the present invention.

FIG. 2 shows a schematic block diagram of the portable telephone 100 having the digital camera according to the first embodiment of the present invention. In FIG. 2, the portable telephone 100 having the digital camera of the present invention is greatly different from the existing example from the viewpoint that two cameras and two liquid crystal display parts are provided. However, many parts of the portable telephone 100 having the digital camera are the same as those of the usual example. Thus, the same parts are designated by the same reference numerals and an explanation thereof is omitted.

In FIG. 2, the first liquid crystal display part 1 and the second liquid crystal display part 2 are driven by the one driver circuit 4. In the driver circuit 4, a display switching part 42 is provided as well as a memory part 41. The display switching part 42 switches whether image information that is read from a memory 19 of the main body board, a below-described memory 27 for the first camera, a memory 28 for the second camera or a memory 29 for a synthesized photograph and stored in the memory part 41 by a control part 18 is displayed on the first liquid crystal display part 1, or on the second liquid crystal display part 2 or on both the first liquid crystal display part and the second liquid crystal display part at the same time. Driver circuits may be respectively provided for the first liquid crystal display part 1 and the second liquid crystal display part 2 to drive the liquid crystal display parts.

To the control part 18, the first camera 23 and the second camera 24 are connected except the above-described members. The control part 18 controls a camera photographing operation in accordance with an operating signal inputted from a key operating part 217. The image information photographed by the first camera 23 and the second camera 24 is stored respectively in the memory 27 for the first camera and the memory 28 for the second camera so as to be readable. The control part 18 not only controls the photographing operations of the first camera 23 and the second camera 24, but also combines the image information stored in the memory 27 for the first camera and the memory 28 for the second camera to form image information for a synthesized photograph and stores the image information for the synthesized photograph in the memory 29 for the synthesized photograph so as to be readable. The memory 27 for the first camera, the memory 28 for the second camera and the memory 29 for the synthesized photograph are not shown in FIG. 1, however, these memories may be provided on the main body board 215 like the memory 19 or may be arranged near the first camera 23 or the second camera 24 in the second casing member 214 and respectively connected to the cameras so that an image signal does not affect a radio part 220. In the memory 19, telephone directory information is stored as well as photographing frames. As the telephone directory information, telephone numbers of persons registered in a telephone directory and the photographs of the faces of the persons registered in the telephone directory are correlated to each other and stored.

Figure 3:
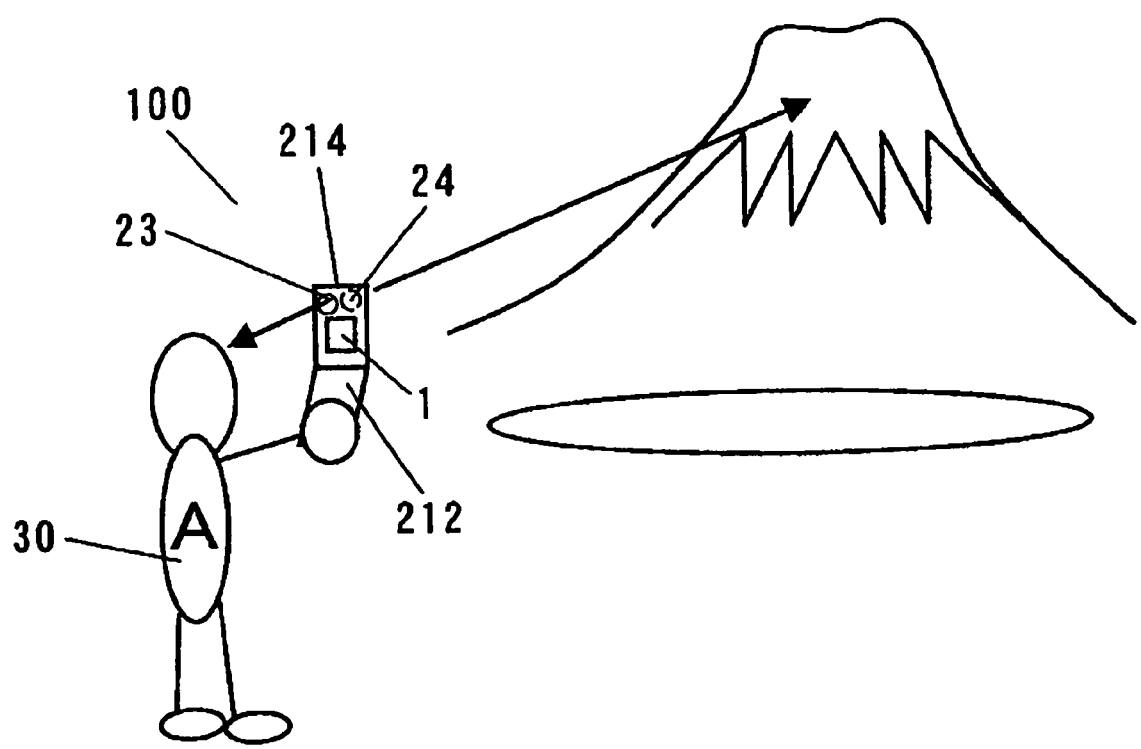
FIG. 3 is a conceptual view showing a using state of the portable telephone having the digital camera according to the first embodiment of the present invention.

FIG. 3 shows a conceptual view of a using state of the portable telephone 100 having the digital camera according to the first embodiment of the present invention. In FIG. 3, a person A 30 who is a user of the portable telephone 100 having the digital camera holds the first casing member 212 by a hand and opens the second casing member 214 to input a camera mode selecting signal to a key operating part 217 and set a mode to a camera mode. Then, the user A 30 selects the first camera 23 to view the face of the user himself or herself displayed for a monitor on the first liquid crystal display part 1 having the first camera 23 and press a shutter button serving as a camera shutter assigned to a key of the key operating part 217. Thus, the user can photograph the face of himself or herself.

Then, while the user A 30 holds the first casing member 212 of the portable telephone 100 having the digital camera by the hand, when the user selects the second camera 24 as a camera for photographing an image, the landscape of a remote mountain caught by the second camera 24 is displayed for a monitor on the first liquid crystal display part 1 on which the face of the user himself or herself has been just displayed as the monitor. Thus, the user A 30 can photograph the landscape of the remote mountain by pressing the camera shutter assigned to the key operating part 217.

As described above, when the user A 30 photographs the face of the user himself or herself, the user selects the first camera 23 to display the monitor image obtained by photographing the face of the user himself or herself on the first liquid crystal display part 1 and photograph the face of the user himself or herself. When the user photographs a remote landscape, the user selects the second camera 24, so that the user can view the monitor image of the remote landscape displayed on the same first liquid crystal display part 1 to photograph the remote landscape.

Figure 4:
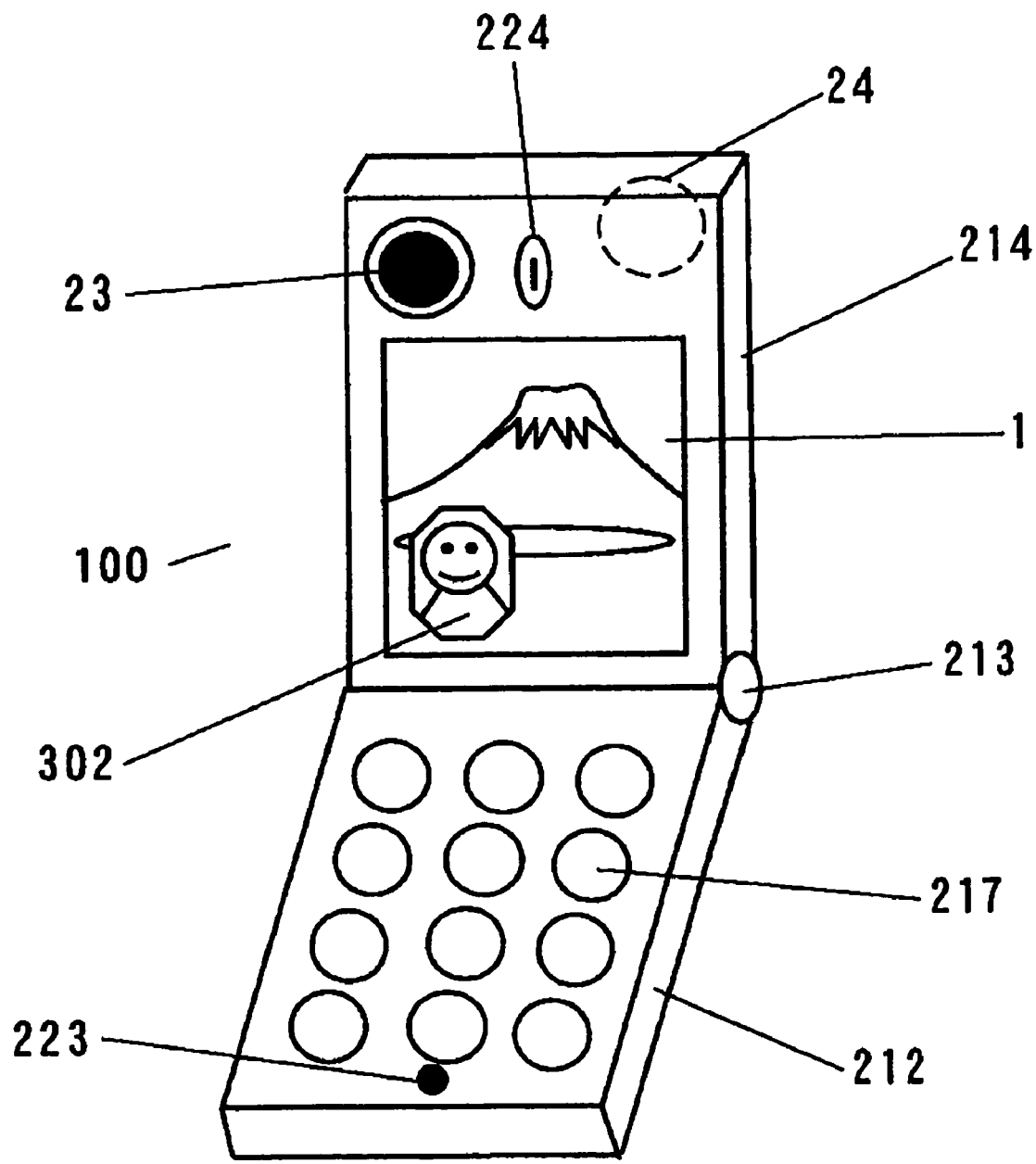
FIG. 4 is an external appearance view when the portable telephone having the digital camera according to the first embodiment of the present invention is opened.

FIG. 4 is an external appearance view of the portable telephone 100 having the digital camera when the user selects the first camera 23 and the second camera 24 to photograph the face of the user and the remote landscape respectively and the user synthesizes the image 302 of the face of the user stored in the memory 27 for the first camera and the image of the landscape stored in the memory 28 for the second camera by the control part 18 to store the synthesized image as a synthesized photograph in the memory 29 for a synthesized photograph, and then, read and display the synthesized photograph. In such a way, the remote landscape and the face of the user himself or herself who views the landscape can be respectively photographed and both the images can be synthesized as the synthesized photograph after both the images are photographed.

In photographing an image by the first camera 23 and the second camera 24, only one camera can be selected or both the cameras can be selected as a camera for photographing an image by using the key operating part 217. Accordingly, the user can firstly photograph the face of the user himself or herself, then photograph the landscape of the remote mountain and synthesize the photographed images later. Otherwise, the user can photograph the face of the user himself or herself and the landscape of the remote mountain at the same time to obtain a synthesized photograph.

As described above, in the present invention, the first camera 23 and the second camera 24 are mounted on the front surface and the back surface of the second casing member 214 to provide in the control part 18 a function for synthesizing the image information photographed by the first camera 23 and the image information photographed by the second camera 24 and storing the synthesized image information in the memory 29 for the synthesized photograph.

SECOND EMBODIMENT

Figure 5:
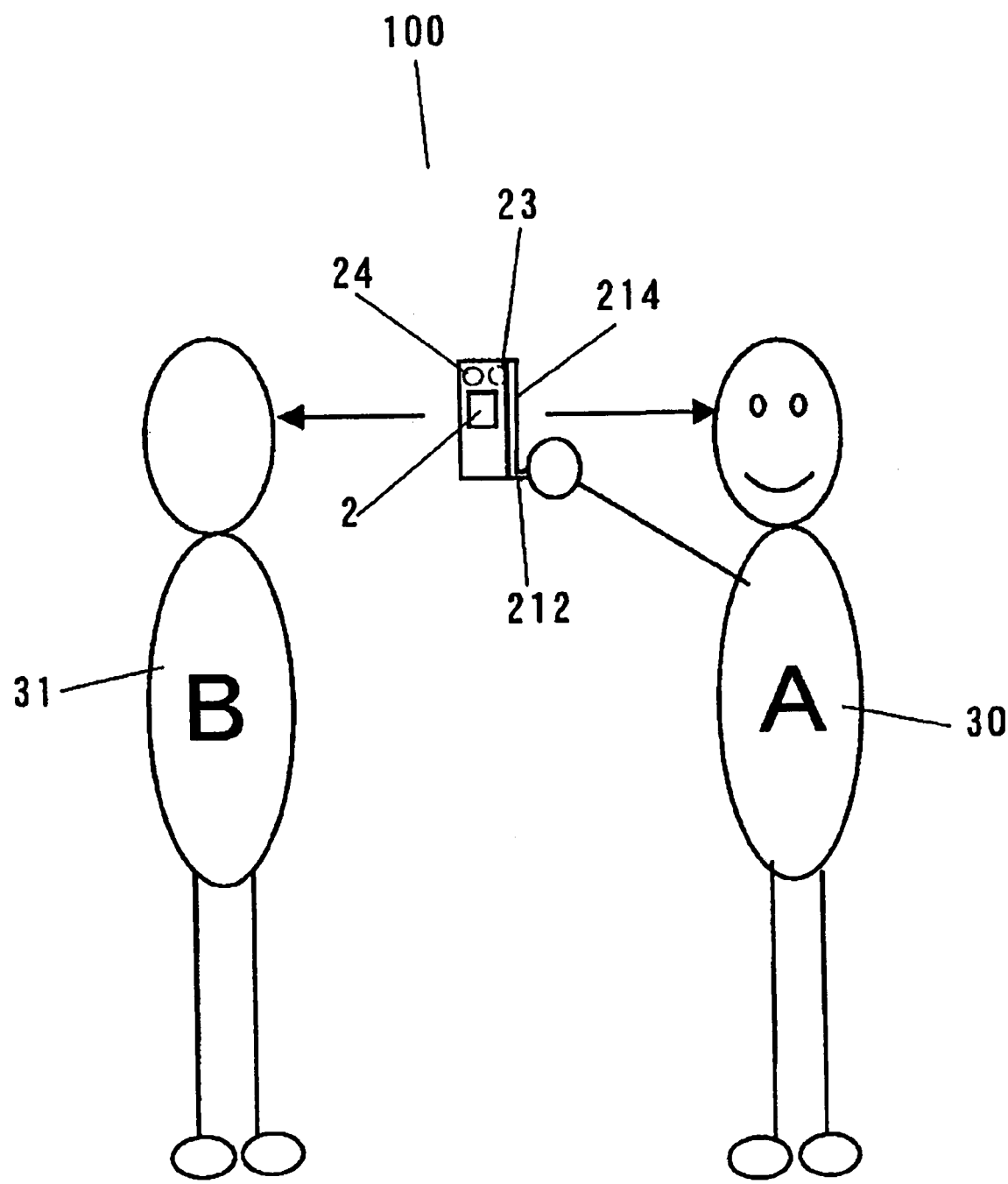
FIG. 5 is a conceptual view showing a using state of a portable telephone equipped with a digital camera according to a second embodiment of the present invention.

Now, a portable telephone equipped with a digital camera according to a second embodiment of the present invention will be described below. FIG. 5 is a conceptual view showing a state that the face of a person A 30 is attempted to be photographed by using a first camera 23 of the portable telephone 100 having the digital camera according to the second embodiment of the present invention and the face of a person B 31 is attempted to be photographed by using a second camera 24 at the same time. The person A 30 holds a first casing member 212 of the portable telephone 100 having the digital camera by a hand to open a second casing member 214 and direct the first camera 23 to the face of the person A 30 himself or herself. Then, the second camera 24 is directed toward the person B 31. At this time, the portable telephone 100 having the digital camera simultaneously displays all part or a part of images caught by the first camera 23 and the second camera 24 on both a first liquid crystal display part 1 and a second liquid crystal display part 2 directly by a display switching part 42 of a driver circuit 4 as monitor images.

Figure 6:
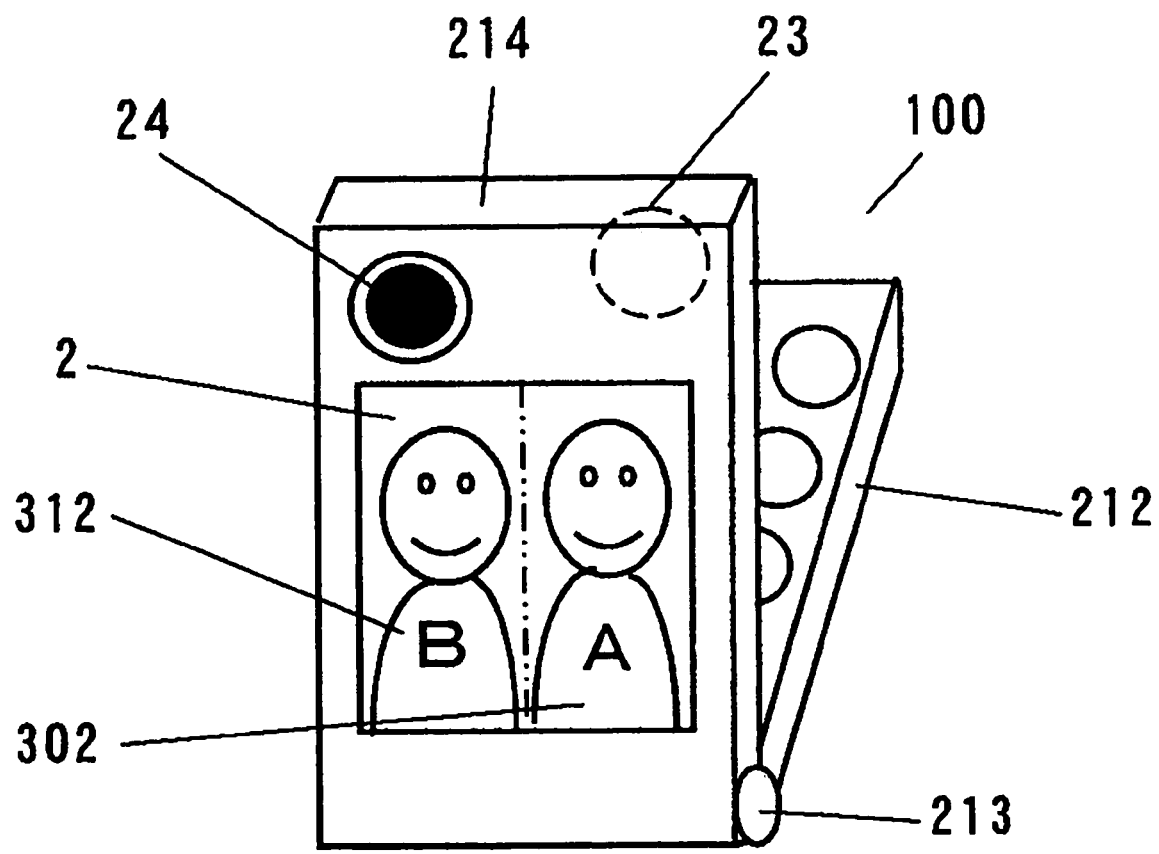
FIG. 6 is an external appearance view of the portable telephone having the digital camera according to the second embodiment of the present invention.
Figure 7:
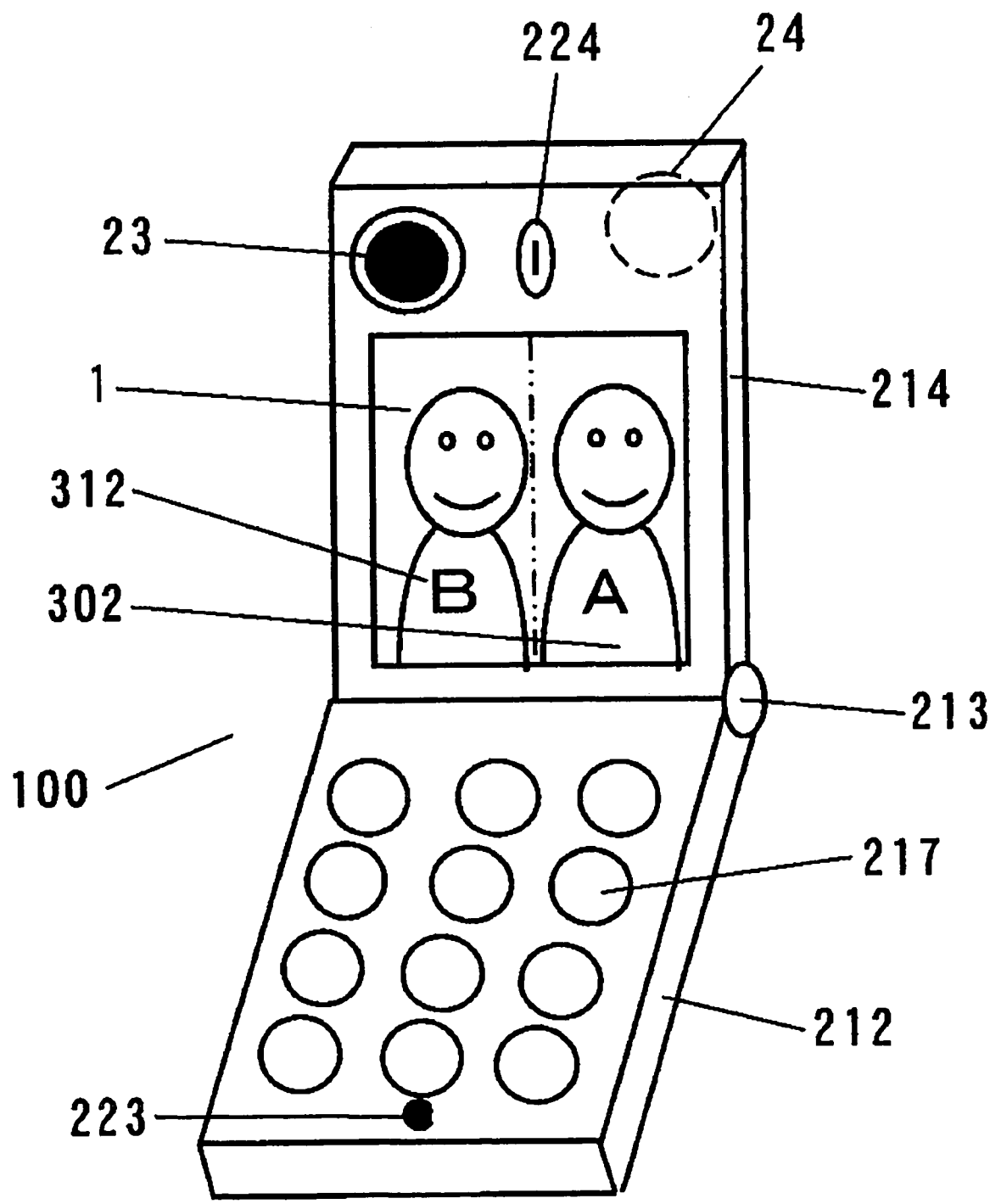
FIG. 7 is an external appearance view of the portable telephone having the digital camera according to the second embodiment of the present invention.

FIG. 6 is an external appearance view of the portable telephone 100 having the digital camera depicted so as to show the second liquid crystal display part 2. FIG. 7 is an external appearance view of the portable telephone 100 having the digital camera depicted so as to show the first liquid crystal display part 1. In FIG. 6, a monitor image 302 of the person A is displayed on the right half part of the second liquid crystal display part 2 and a monitor image 312 of the person B is displayed on a left half part.

In FIG. 7, the monitor image 302 of the person A is likewise displayed on the right half part of the first liquid crystal display part 1 and the monitor image 312 of the person B is displayed on the left half part. As described above, the display of the monitor image formed by synthesizing both the images of the persons A and B is viewed at the same time so that a photograph having two persons standing side by side can be simply formed at good timing.

When the display of the monitor image in which the images of both the persons A and B are combined together is viewed to press a shutter button assigned to a key operating part 217, the image information of the person A photographed by the first camera 23 is stored in a memory 27 for the first camera. The image information of the person B photographed by the second camera 24 is stored in a memory 28 for the second camera. The image information of a synthesized photograph formed by synthesizing both the images of the persons A and B is stored in a memory 29 for a synthesized photograph. A user may previously set by the key operating part 217 so that image information photographed by viewing the display of the monitor image having both the images of the persons A and B synthesized is stored only in, for instance, the memory 29 for the synthesized photograph.

THIRD EMBODIMENT

Figure 8:
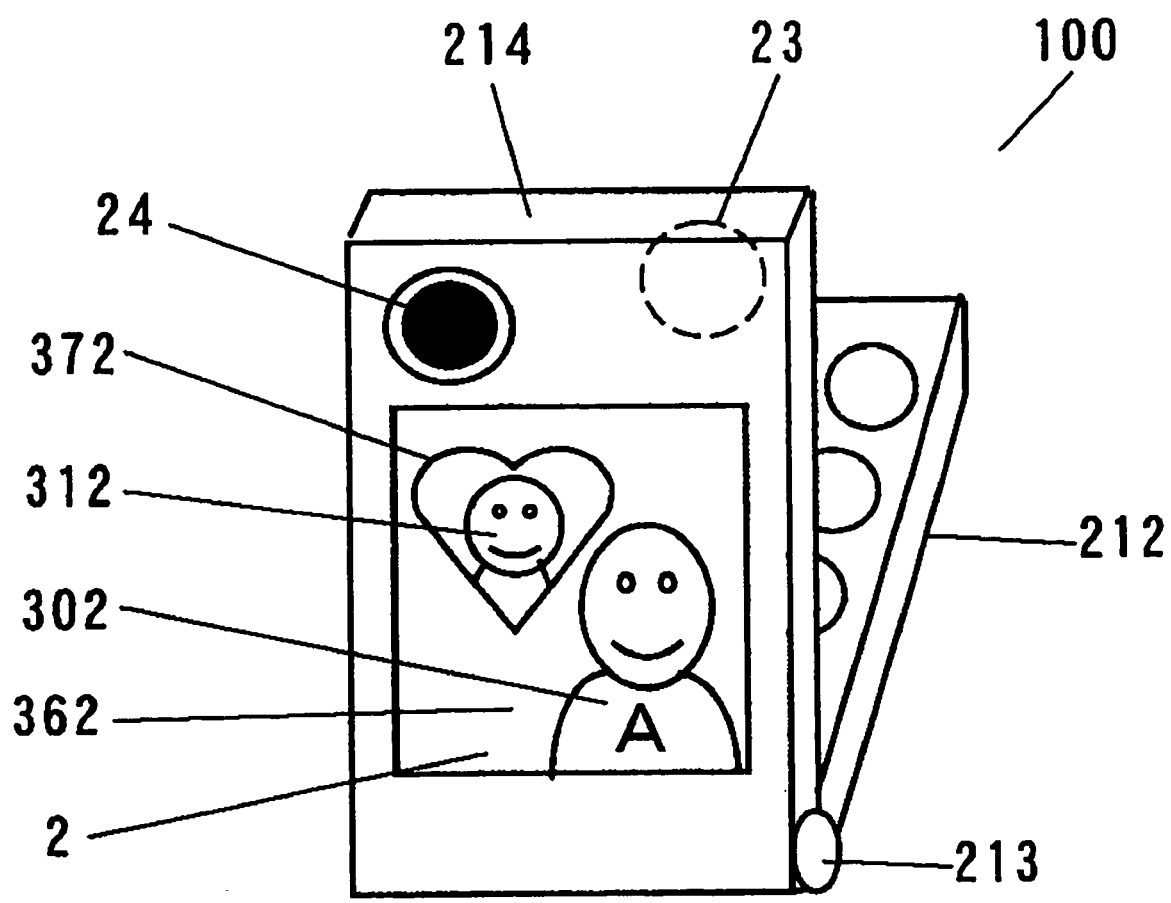
FIG. 8 is an external appearance view of a portable telephone equipped with a digital camera according to a third embodiment of the present invention.
Figure 9:
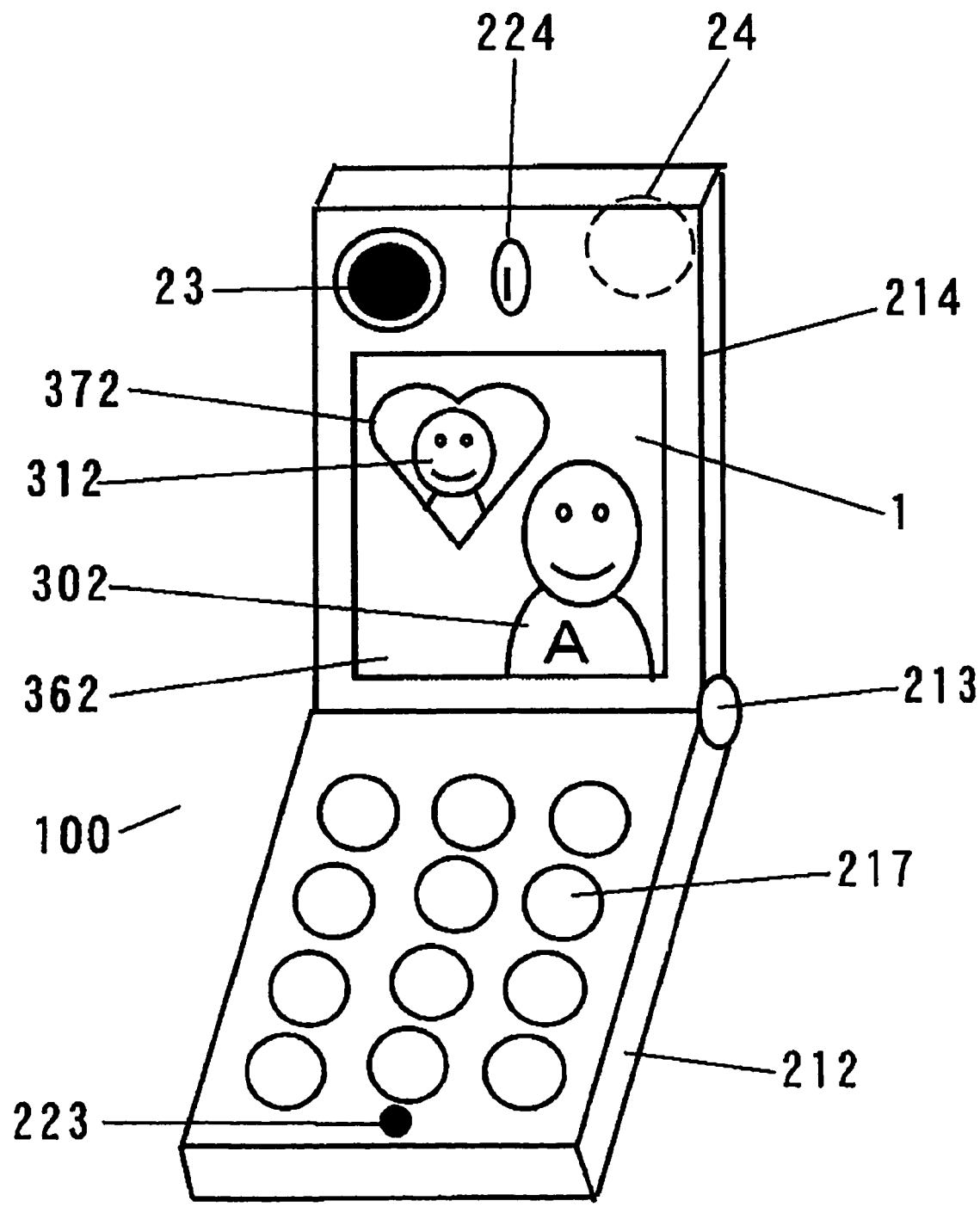
FIG. 9 is an external appearance view of the portable telephone having the digital camera according to the third embodiment of the present invention.

Now, a portable telephone equipped with a digital camera according to a third embodiment of the present invention will be described below. FIGS. 8 and 9 show external appearance views of the portable telephone having the digital camera according to the third embodiment of the present invention in which the information of an image photographed by one camera is displayed in a display area of a frame of a prescribed form at a prescribed position. FIG. 8 is an external appearance view depicted so as to show a second liquid crystal display part 2. FIG. 9 is an external appearance view depicted so as to show a first liquid crystal display part 1. In FIGS. 8 and 9, an image 302 of a person A that is displayed in a first display area 362 is synthesized with a monitor image 312 of a person B that is fitted to a second display area 372 of a heart form. When the display of a monitor image in which both the images of the persons A and B are synthesized is viewed to press a shutter button assigned to a key operating part 217, the information of the image of the person A photographed by a first camera 23 is stored in a memory 27 for the first camera, and the information of the image of the person B photographed by a second camera 24 is stored in a memory 28 for the second camera. The image information of a synthesized photograph in which the images of the persons A and B are synthesized is stored in a memory 29 for a synthesized photograph in the same manner as that of the second embodiment as already described above.

The form and the position of the second display area 372 are not shown in the drawing, however, many kinds of frames for fitting photographs are previously stored in a memory 219 so as to be selected by using the key operating part 217.

Figure 10:
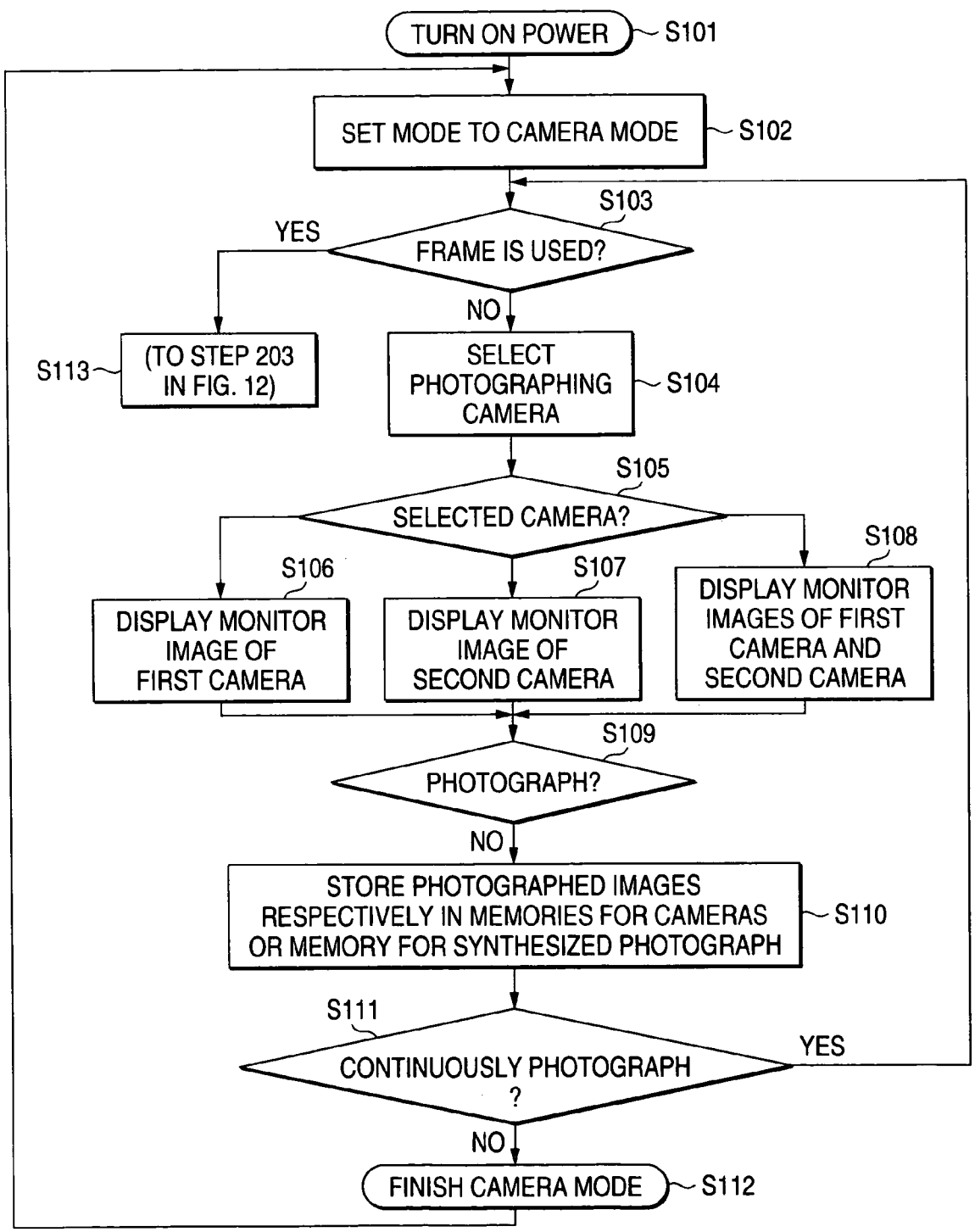
FIG. 10 is a flowchart of a camera mode of a portable telephone equipped with a digital camera according to the present invention.

FIG. 10 shows a basic control procedure as a flowchart when an image is photographed by the camera of the portable telephone having the digital camera according to the present invention as described above. Initially, a user (a photographer) who holds the portable telephone 100 having the digital camera turns on a power switch of the key operating part 217 (step 101). Then, a camera mode selecting signal is inputted by the key operating part 217 to operate a camera mode by a control part 18 (step 102). Then, an inquiry screen showing whether or not a photograph fitting frame is used in the first liquid crystal display part 1 of a second casing member 214 is displayed. Thus, when the photograph fitting frame is not used, No (N) is selected (step 103).

Then, an inquiry screen showing which of cameras is used to photograph an image is also displayed on the first liquid crystal display part 1. Thus, the first camera 23, the second camera 24 or both the cameras are selected (step 104). Then, in accordance with a selected result (step 105), a monitor image by the selected camera is displayed on the first liquid crystal display part 1 (step 106, step 107, step 108). The monitor image may be switched to be displayed on the second liquid crystal display part 2 by using the key operating part 217 as required. The user views the monitor image to press the shutter button assigned to a ten key button of the key operating part 217 and photograph the image (step 109). The photographed image is stored in the memory 27 for the first camera used for a photographing operation, the memory 28 for the second camera or the memory 29 for the synthesized photograph (step 110).

When the photographing operation is continuously carried out (step 111), the procedure returns to the step 103. When the photographing operation is not continuously carried out, that is, when the photographing operation is finished, a camera mode completing signal is inputted from the key operating part 217 to complete the camera mode (step 112). In the step 103, a case that the photograph fitting frame for fitting the image is used is not described. This will be described below.

FOURTH EMBODIMENT

Now, a portable telephone equipped with a digital camera according to a fourth embodiment of the present invention will be described below. In the portable telephone having the digital camera according to the fourth embodiment of the present invention, when an opening and closing detecting unit 221 detects a signal showing that a second casing member 214 is closed under a camera mode, the camera mode is finished. When the opening and closing detecting unit detects a signal showing that the second casing member 214 is opened without a direct input of other signal, a mode is returned again to the camera mode.

Figure 11:
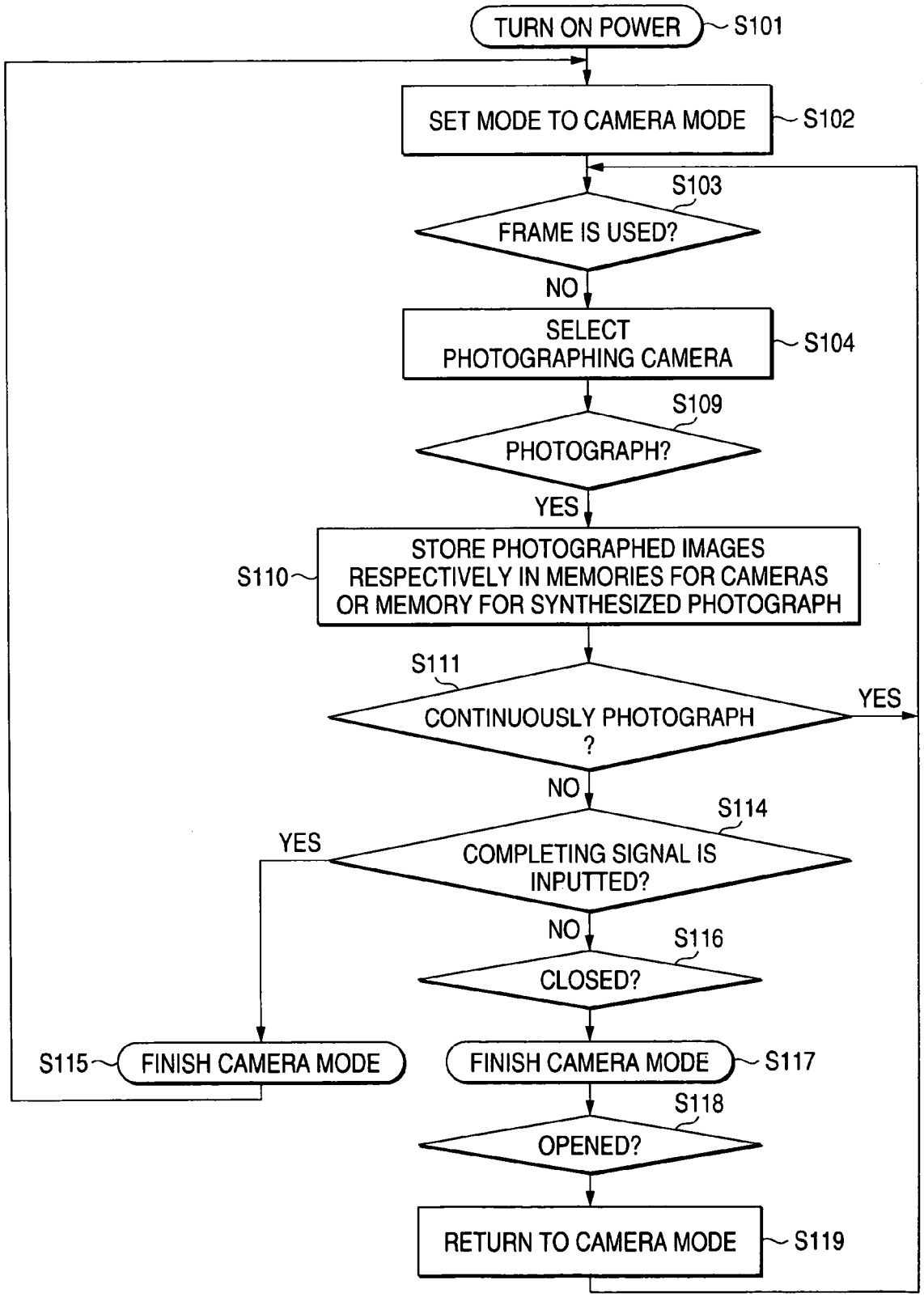
FIG. 11 is a flowchart of a camera mode of a portable telephone equipped with a digital camera according to a fourth embodiment of the present invention.

FIG. 11 shows a flowchart of an operation of the portable telephone having the digital camera according to the fourth embodiment of the present invention. Steps the same as those of FIG. 10 are designated by the same step numbers. For the purpose of simplifying an explanation, steps 105 to 108 are not described.

A user (a photographer) who holds the portable telephone 100 having the digital camera turns on a power switch of a key operating part 217 (step 101). Then, the user inputs a camera mode selecting signal by the key operating part 217 to operate a camera mode by a control part 18 (step 102). When the user does not use a photograph fitting frame (step 103), the user selects a camera for photographing an image (step 104). The user views a monitor image to press a shutter button assigned to a ten key button of the key operating part 217 and photograph the image (step 109). The photographed image is stored in a memory 27 for a first camera used for a photographing operation, a memory 28 for a second camera or a memory 29 for a synthesized photograph (step 110).

When the photographing operation is continuously carried out (step 111), the procedure returns to the step 103. When the photographing operation is not continuously carried out, a camera mode completing signal is inputted (step 114) from the key operating part 217 to complete the camera mode (step 115). In the step 114, when the second casing member 214 is closed (step 116) in place of inputting the camera mode completing signal, the camera mode is completed (step 117). When the second casing member 214 is opened (step 118) without inputting other signal, a mode returns again to the camera mode (step 119) so that the procedure can return to the step 103.

The procedure may be controlled not to return to the step 103 from the step 119 but to return to the step 109 from the step 119. In FIG. 11, when it is detected that the second casing member 214 is closed after the image is photographed once, the camera mode is completed. However, when it is detected that the second casing member 214 is closed after the mode is set to the camera mode in the step 102, the procedure may jump to the step 117 to complete the camera mode. As described above, the second casing member is closed to complete the camera mode after the camera mode is operated once, and then, the second casing member is opened to return to the camera mode. Accordingly, the image can be immediately photographed so that a shutter chance is not missed with advantage.

FIFTH EMBODIMENT

Now, a portable telephone equipped with a digital camera according to a fifth embodiment of the present invention will be described. In the portable telephone having the digital camera according to the fifth embodiment, when an image is photographed by a first camera 23 or a second camera 24, a using method is realized in which photograph fitting frames stored in a memory 19 are read to sequentially fit photographed images in blank frames.

Figure 12:
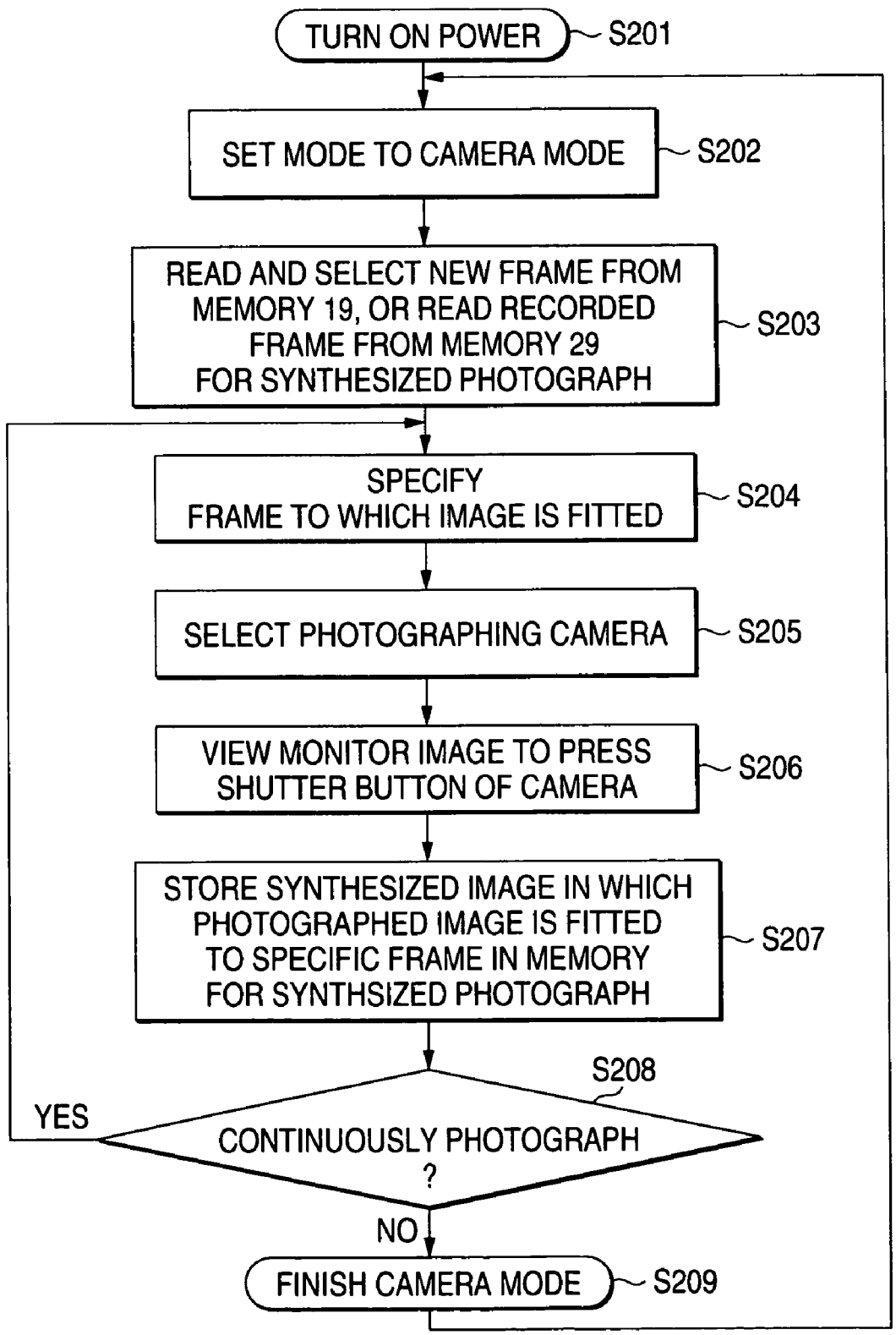
FIG. 12 is a flowchart of a camera mode of a portable telephone equipped with a digital camera according to a fifth embodiment of the present invention.
Figure 13:
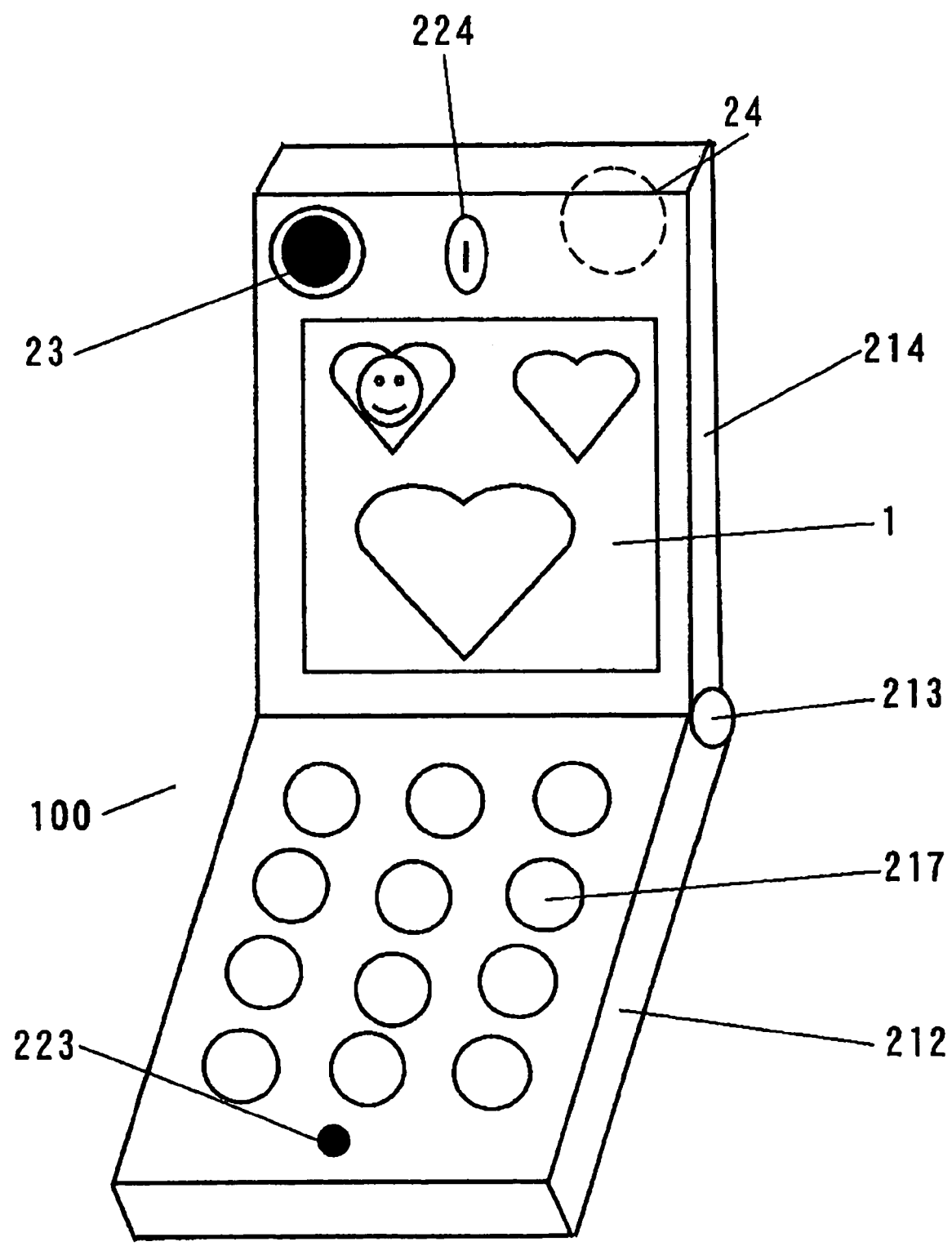
FIG. 13 is an external appearance view of the portable telephone having the digital camera according to the fifth embodiment of the present invention.

FIG. 12 shows a flowchart of an operation. A user of the portable telephone having the digital camera turns on a power of the portable telephone having the digital camera (step 201), and then inputs a camera mode selecting signal by a key operating part 217 to set a mode to a camera mode (step 202). Then, the user reads the photograph fitting frames stored in the memory 19 to select favorite frames, for instance, frames having three blank heart shaped frames as shown in FIG. 13 (step 203). Then, the blank frame to which an image to be photographed is desired to be fitted is inputted by the key operating part 217 to specify the blank frame. Here, an explanation is given on the assumption that an upper left frame shown in FIG. 13 is specified (step 204). Then, a camera is selected (step 205) to view a monitor image displayed on a first liquid crystal display part 1, press a shutter button assigned to the key operating part 217 and photograph the image (step 206). In an example shown in FIG. 13, the image information of a synthesized photograph in which the photographed image is fitted to the upper left heart-shaped frame is stored in a memory 29 for a synthesized photograph (step 207). In the monitor display of the first liquid crystal display part 1, the photographed image is displayed on one frame. Thus, a procedure from the step 204 to the step 207 is performed so that photographed images can be successively fitted to the blank frames. When all the blank frames are not immediately filled with the photographed images, the camera mode is finished once (step 209). Subsequently, the mode is set again to the camera mode in the future (step 202) to read the stored frames from the memory 29 for the synthesized photograph (203). The procedure from the steps 204 to 207 is performed so that images to be newly photographed can be fitted to the blank frames.

SIXTH EMBODIMENT

Now, a portable telephone equipped with a digital camera according to a sixth embodiment of the present invention will be described below. In the first to fifth embodiments of the portable telephone having the digital camera according to the present invention, a foldable portable telephone is described as an example. However, the present invention can be applied to a portable telephone except the foldable portable telephone.

Figure 14:
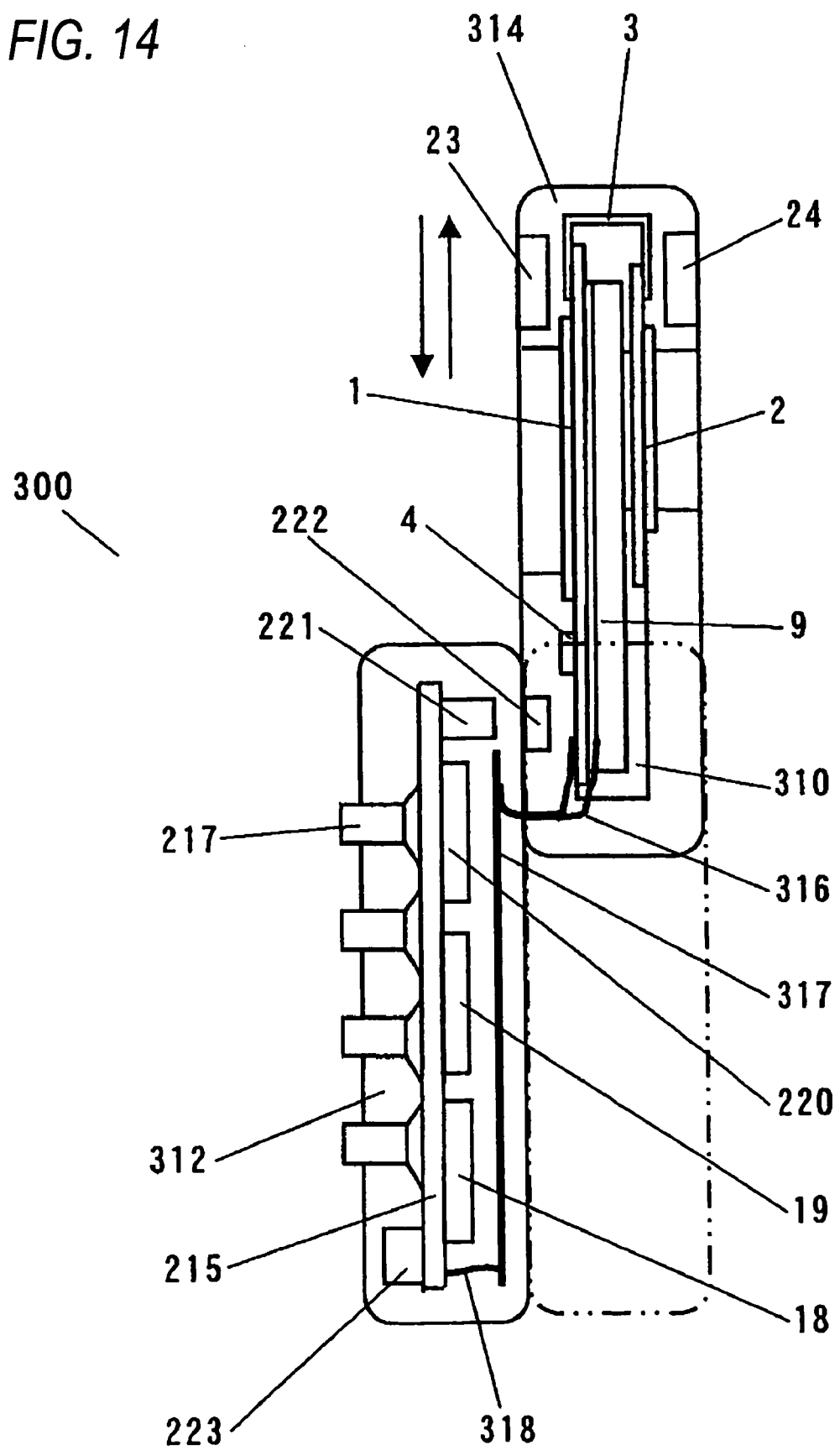
FIG. 14 is a schematic sectional view of a portable telephone equipped with a digital camera according to a sixth embodiment of the present invention.

FIG. 14 shows an example in which the present invention is applied to what is called a slide type portable telephone 300 equipped with a digital camera constructed in such a way that a second casing member 314 including a first camera 23 and a second camera 24 provided in front and back surfaces is allowed to slide relative to a first casing member 312. The second casing member 314 slides upward and downward relative to the first casing member 312 as shown by arrow marks in the drawing. The first camera 23 and the second camera 24 are mounted on the front and back surfaces of the second casing member 314. This structure is the same as the structure that is already described in the first embodiment shown in FIG. 1.

A first liquid crystal display part 1 and a back light 9 are connected to a slide contact 316. The first camera 23 and the second camera 24 are connected to the slide contact 316, which is not shown in the drawing. A fixed contact 317 is provided in the first casing member 312. The fixed contact 317 is connected to a main body board 215 by wiring 318. The slide contact 316 has a resiliency and freely slides while the slide contact remains coming into contact with the fixed contact 317 under a prescribed pressure. The sliding state of the second casing member 314 is detected by a magnet 222 and an opening and closing detecting unit 221. While the second casing member 314 protrudes, an image photographed by the first camera 23 or the second camera 24 is displayed on the first liquid crystal display part 1 or a second liquid crystal display part 2.

In the slide type portable telephone 300 having the digital camera according to the present invention, since a photographing camera can be selected while the portable telephone is held by a hand, an image in the face side of a user and an image opposite to the face of the user can be effectively selectively photographed without shifting the portable telephone from one hand to the other hand or turning out the portable telephone in accordance with an object to be photographed.

SEVENTH EMBODIMENT

Figure 15:
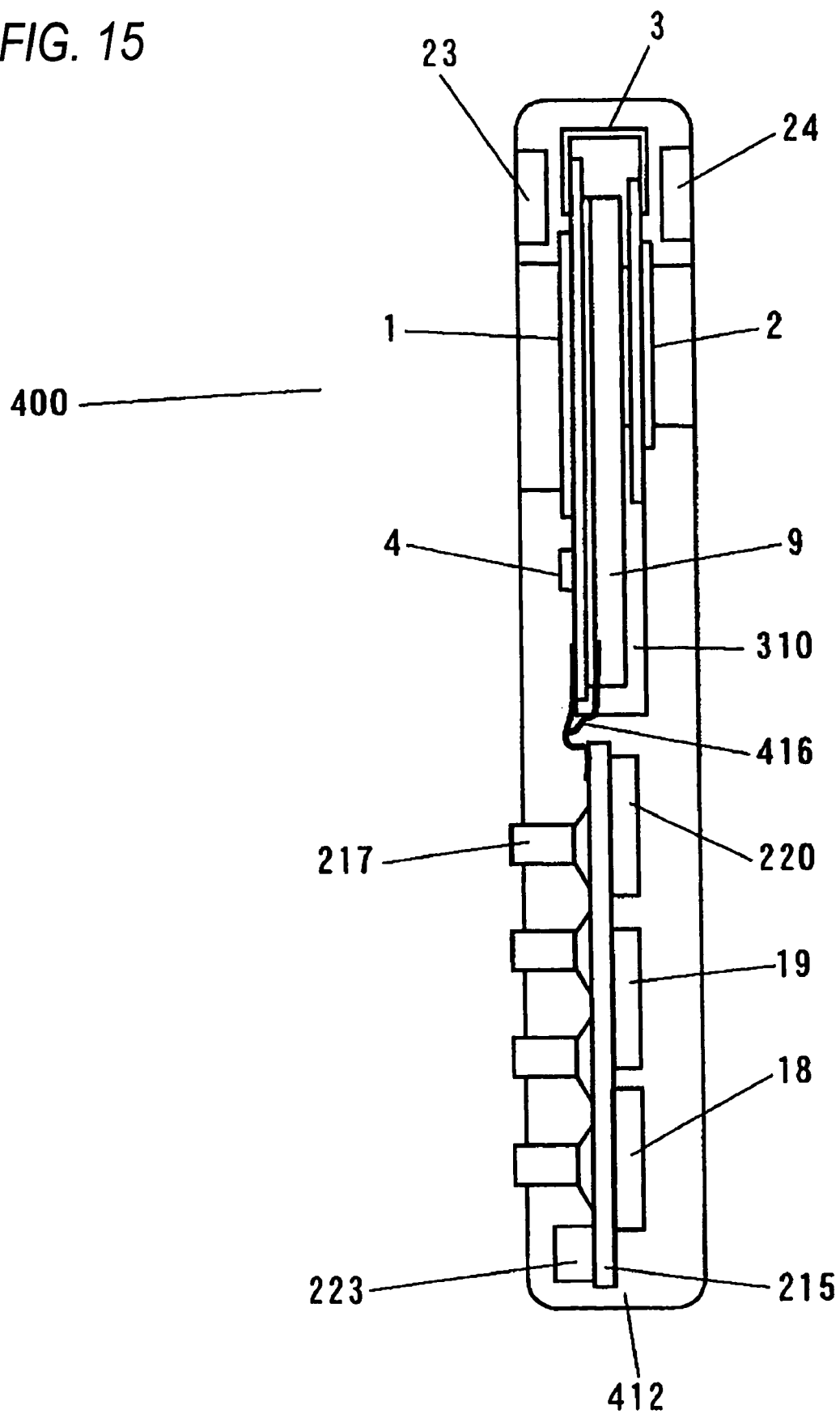
FIG. 15 is a schematic sectional view of a portable telephone equipped with a digital camera according to a seventh embodiment of the present invention.

Now, a portable telephone equipped with a digital camera according to a seventh embodiment of the present invention will be described below. FIG. 15 shows an example in which the present invention is applied to what is called a straight type portable telephone 400 equipped with a digital camera. A first camera 23 and a second camera 24 are mounted on the front and back surfaces of a casing member 412. This structure is the same as the already described structure of the first embodiment shown in FIG. 1.

In the straight type portable telephone 400 according to the seventh embodiment of the present invention, an effect that one or both of a plurality of cameras provided in the front and back surfaces of the casing member can be simply selected as a photographing camera or an effect that a synthesized photograph can be easily taken can be obtained similarly to a case that the present invention is applied to the above-described foldable portable telephone 100 or the slide type portable telephone 300.

In the above-described explanation, the portable telephone having the digital camera is shown as the embodiments. However, in a recent portable telephone, a portable telephone having a switch for turning off a power of a radio part is put to practical use. Since the portable telephone having the digital camera in which the power of the radio part is turned off may be considered to be the substantially same as the digital camera, the present invention can be applied to the digital camera itself in which a function of the portable telephone is removed.

The present invention is described in detail by referring to the specific embodiments. However, it is to be understood to a person with ordinary skill in the art that various changes or modifications may be made without departing the spirit and scope of the present invention.

This application is based on Japanese Patent Application No. 2002-309348 filed on Oct. 24, 2002 and the contents thereof are incorporated therein as a reference.

INDUSTRIAL APPLICABILITY

As described above, according to the present invention, a photographing camera is selected, so that while a user holds a digital camera or a portable telephone equipped with a digital camera by a hand, the user can selectively photograph an image located in the side of the face of the user and an image located in an opposite side to the face of the user without turning out the digital camera or the portable telephone having the digital camera. Further, the image located in the side of the face of the user and the image located in the opposite side to the face of the user can be photographed at the same time.

Further, the image located in the side of the face of the user who holds the portable telephone and the image located in the opposite side to the face of the user, which are photographed by holding the digital camera or the portable telephone having the digital camera by a hand, can be photographed as a synthesized image.

Further, one screen of the monitor unit can be divided into the first display area and the second display area to display all or a part of the image photographed by the first camera on the first display area and display all or a part of the image photographed by the second camera on the second display area.

Further, the images photographed by the first camera and the second camera can be respectively viewed at the same time from the first liquid crystal display part and the second liquid crystal display part of the monitor unit.

Further, while the user holds the digital camera or the portable telephone having the digital camera by the hand, the user can photograph a moving image located in the side of the face of the user and a moving image located in the opposite side to the face of the user without turning out the digital camera or the portable telephone having the digital camera.

Further, according to the present invention, while the camera mode is operated, only when the casing member of the foldable portable telephone is closed, the camera mode is completed. Further, only when the casing member is directly opened, the camera mode can be effectively operated again to prevent a shutter chance from being missed with good maneuverability.

The invention claimed is:

1. A digital camera, comprising:
a first camera provided on a first surface of a casing member;
a first liquid crystal display part provided on the first surface of the casing member;
a second camera provided on a second surface in the back side of the first surface of the casing member;
a second liquid crystal display part provided on a second surface in the back side of the first surface of the casing member;
a control unit that controls photographing operations of the first camera and the second camera; and
a camera selecting unit that allows the user to select both the first camera and the second camera at the same time, thereby allowing the first camera and the second camera to photograph images at the same time, wherein the first liquid crystal display part has a first display area and a second display area, the first display area displays all or a part of images caught by the first camera, and the second display area displays all or a part of images caught by the second camera, and the second liquid crystal display part has a third display area and a fourth display area, the third display area displays all or a part of images caught by the first camera, and the fourth display area displays all or a part of images caught by the second camera.

2. The digital camera according to claim 1, further comprising a camera selecting unit that selects a camera for photographing, wherein both the first camera and the second camera are selected by the camera selecting unit to photograph images by both the first camera and the second camera at the same time.

3. The digital camera according to claim 1, further comprising an image synthesizing unit that synthesizes the images photographed by the first camera and the second camera to photograph the synthesized image obtained by synthesizing the images photographed by the first camera and the second camera.

4. The digital camera according to claim 1, further comprising an image storing unit for storing a moving image photographed by the first camera or the second camera.

5. A portable telephone equipped with a digital camera on which the digital camera according to any one of claims 1 to 3 and 4 is mounted.

6. The digital camera according to claim 1, wherein an image displayed in the first display area and an image displayed in the third display area are substantially identical, and an image displayed in the second display area and an image displayed in the fourth display area are substantially identical.

7. The digital camera according to claim 1, wherein the images caught by the first camera and the images caught by the second camera are simultaneously displayed in both the first liquid crystal display part and the second liquid crystal display part.

* * * * *

UNITED STATES PATENT AND TRADEMARK OFFICE
CERTIFICATE OF CORRECTION

PATENT NO. : 7,583,316 B2
APPLICATION NO. : 10/532399
DATED : September 1, 2009
INVENTOR(S) : Miyashita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this

Fourteenth Day of September, 2010

David J. Kappos
*Director of the United States Patent and Trademark Office*